US012757220B2

(12) United States Patent
Xu et al.

(10) Patent No.: US 12,757,220 B2
(45) Date of Patent: Oct. 6, 2026

(54) METHODS AND APPARATUSES FOR INFORMATION TRANSMISSION

(71) Applicant: GUANGDONG OPPO MOBILE TELECOMMUNICATIONS CORP., LTD., Dongguan (CN)

(72) Inventors: Weijie Xu, Dongguan (CN); Haitao Li, Dongguan (CN); Yi Hu, Dongguan (CN); Zhisong Zuo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 357 days.

(21) Appl. No.: 18/590,331

(22) Filed: Feb. 28, 2024

(65) Prior Publication Data

US 2024/0205940 A1 Jun. 20, 2024

Related U.S. Application Data

(63) Continuation of application No. PCT/CN2021/118127, filed on Sep. 14, 2021.

(51) Int. Cl.
*H04W 72/232* (2023.01)
*H04B 7/0413* (2017.01)

(52) U.S. Cl.
CPC ........ *H04W 72/232* (2023.01); *H04B 7/0413* (2013.01)

(58) Field of Classification Search
CPC ...... H04B 7/0413; H04B 7/0417–0487; H04L 5/0023; H04L 5/0025; H04L 5/0048; H04L 5/0053–0057; H04W 72/23–232
See application file for complete search history.

(56) References Cited

U.S. PATENT DOCUMENTS

2018/0191413 A1* 7/2018 Suzuki ................. H04B 7/0486
2020/0029315 A1* 1/2020 Lin ................... H04W 52/0216
2020/0389283 A1 12/2020 Manolakos et al.
2022/0304024 A1* 9/2022 Maleki ................... H04B 7/063
2022/0345906 A1* 10/2022 Kakishima ........ H04W 52/0216
2022/0360301 A1* 11/2022 Park ..................... H04B 7/0473
2023/0027089 A1* 1/2023 Pelletier ................ H04L 1/1816

FOREIGN PATENT DOCUMENTS

CN 104702535 A 6/2015
CN 112055982 A 12/2020
CN 112332891 A 2/2021
(Continued)

OTHER PUBLICATIONS

International Search Report in the International Application No. PCT/CN2021/118127, mailed on Jun. 10, 2022, with English translation provided by WIPO.
(Continued)

*Primary Examiner* — Thomas R Cairns
(74) *Attorney, Agent, or Firm* — Ladas & Parry, LLP

(57) ABSTRACT

Methods and apparatuses for information transmission are provided. The method includes that first downlink control information (DCI) is received by a terminal device. The first DCI includes first indication information for indicating a maximum number of multiple-input multiple-output (MIMO) layers for receiving data by the terminal device.

19 Claims, 3 Drawing Sheets

(56) References Cited

FOREIGN PATENT DOCUMENTS

WO 2023/039699 A1 3/2023

OTHER PUBLICATIONS

Written Opinion of the International Search Authority in the International Application No. PCT/CN2021/118127, mailed on Jun. 10, 2022, with English translation provided by WIPO.
3GPP TSG RAN Rel-18 workshop RWS-210358, Electronic Meeting, Jun. 28-Jul. 2, 2021, Source: CMCC, Title: Network energy saving, Agenda item: 4.3, the whole document.
3GPP TSG RAN Rel-18 workshop RWS-210447, Electronic Meeting, Jun. 28-Jul. 2, 2021, Source: Huawei, HiSilicon, Title: Network energy saving and green operation for NR, Agenda item: 4.3, Document for: Discussion and decision.

* cited by examiner

METHODS AND APPARATUSES FOR INFORMATION TRANSMISSION

CROSS-REFERENCE TO RELATED APPLICATION

This is a continuation of International Patent Application No. PCT/CN2021/118127, filed on Sep. 14, 2021, the disclosure of which is hereby incorporated by reference in its entirety.

BACKGROUND

With the development of communication technology, a communication system supports a larger bandwidth, higher speed and lower time delay. For example, a new radio (NR) system supports transmission at a speed of several Giga bit per second (Gbps) or even tens of Gbps on a bandwidth of hundreds Mega Hertz (MHz) or even several Giga hertz (GHz).

However, the larger bandwidth and higher speed may pose more challenges for devices in the communication system. For a terminal device in the communication system, the larger bandwidth may lead to a sharp increase in power consumption of radio frequency components such as an analog to digital converter (AD/DA), a power amplifier (PA) and a filter in radio frequency path of the terminal device. The higher speed requires a device (such as a filter, digital signal processing (DSP), a field-programmable gate array (FPGA), etc.) used for baseband processing in the terminal device to run at a high speed, which may also lead to an increase in power consumption. Similar to the terminal device, for a network device, statistical data shows that the power consumption of the network device in the NR system has increased by three to four times compared with that in a long term evolution (LTE) system.

SUMMARY

Embodiments of the disclosure relate to the technical field of communications, and in particular to method s and apparatuses for information transmission. The technical solutions are described as follows.

In an aspect, there is provided a method for information transmission in an embodiment of the disclosure. The method is applied to a terminal device and includes the following operation.

First downlink control information (DCI) is received. The first DCI includes first indication information for indicating a maximum number of multiple-input multiple-output (MIMO) layers for receiving data by the terminal device.

In another aspect, there is provided a method for information transmission in an embodiment of the disclosure. The method is applied to a network device and includes the following operation.

First downlink control information (DCI) is transmitted. The first DCI includes first indication information for indicating a maximum number of multiple-input multiple-output (MIMO) layers for receiving data by a terminal device.

In a further aspect, there is provided an apparatus for information transmission in an embodiment of the disclosure. The apparatus is provided in a terminal device and includes a processor and a transceiver connected to the processor.

The processor is configured to control the transceiver to receive first downlink control information (DCI). The first DCI includes first indication information for indicating a maximum number of multiple-input multiple-output (MIMO) layers for receiving data by the terminal device.

BRIEF DESCRIPTION OF THE DRAWINGS

In order to describe the technical solutions in the embodiments of the disclosure more clearly, the drawings required in the description of the embodiments will be introduced briefly below. It is apparent that the drawings described below are merely some embodiments of the disclosure, and other drawings may be obtained from these drawings without paying inventive effort by those of ordinary skill in the art.

DETAILED DESCRIPTION

In order to make the objects, technical solutions and advantages of the disclosure clearer, the embodiments of the disclosure will be described in further detail below with reference to the accompanying drawings.

The network architectures and service scenarios described in the embodiments of the disclosure are intended to explain the technical solutions of the embodiments of the disclosure more clearly, and do not constitute limitation to the technical solutions provided in the embodiments of the disclosure. It is understood by those of ordinary skill in the art that with the evolution of the network architectures and the emergence of new service scenarios, the technical solutions provided in the embodiments of the disclosure are also applicable to similar technical problems.

Figure 1:
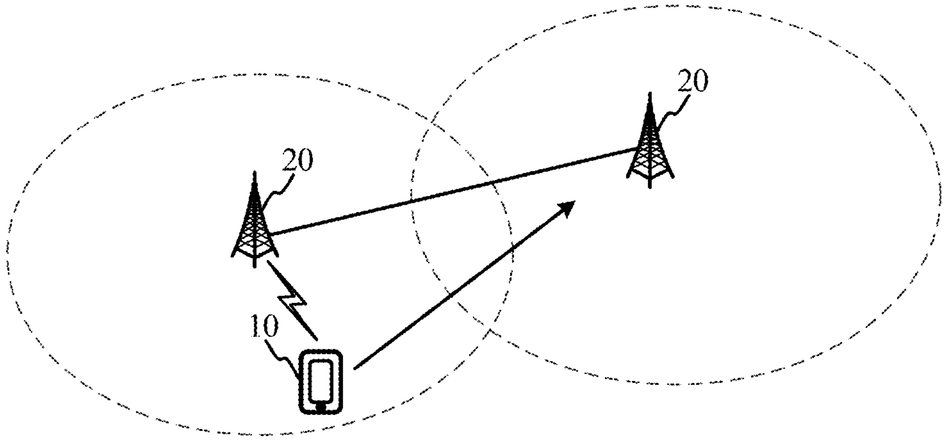
FIG. 1 is a schematic diagram of system architecture of a communication system provided in an embodiment of the disclosure.

Reference is made to FIG. 1, which illustrates a schematic diagram of system architecture of a communication system provided in an embodiment of the disclosure. The system architecture may include a terminal device 10 and a network device 20.

There may generally be multiple terminal devices 10, and one or more terminal devices 10 may be distributed within a cell managed by a respective network device 20. The terminal device 10 may include a handheld device, a vehicle-mounted device, a wearable device, a computing device with wireless communication capabilities, or other processing devices connected to a wireless modem, as well as various forms of user equipment (UE), mobile stations (MS), and the like. For convenience of description, the above-mentioned devices are collectively referred to as the terminal device in embodiments of the disclosure.

The network device 20 is a device deployed in an access network to provide a wireless communication function for the terminal device 10. The network device 20 may include various forms of macro base stations, micro base stations, relay stations, access points, and the like. In systems with different wireless access technologies, the names of devices with the network device function may vary, for example, they are called gNodeB or gNB in the NR system. With the evolution of communication technology, the name "network device" may change. For convenience of description, the above-described device providing the wireless communication function for the terminal device 10 are collectively referred to as the network device in embodiments of the disclosure.

The term "NR system" in embodiments of the disclosure may also be referred to as 5th generation mobile communication technology (5G) system or 5G NR system, the meaning thereof may be understood by those skilled in the art. The technical solutions described in embodiments of the disclosure may be applicable to the NR system, and may also be applicable to a communication system of the subsequent evolution of the NR system, such as 6G (6th Generation) system and the like.

With the development of communication technology, the communication system supports a larger bandwidth, higher speed and lower time delay. For example, the NR system supports transmission at a speed of several Gbps or even tens of Gbps on a bandwidth of hundreds of MHz or even several GHz. The communication system with the larger bandwidth, higher speed and lower time delay supports real-time high-definition live, high-definition movie download, augmented reality (AR), virtual reality (VR) and other services, which can be expected to bring better user experience.

However, the larger bandwidth and higher speed will pose more challenges for devices in communication system. For the terminal device in the communication system, the larger bandwidth may lead to a sharp increase in power consumption of radio frequency components such as the AD/DA, PA and filter in a radio frequency path of the terminal device. The higher speed requires the device (such as the filter, DSP, FPGA, etc.) for baseband processing in the terminal device to run at a high speed, which will also lead to an increase in power consumption. Similar to the terminal device, for the network device, statistical data show that the power consumption of the network device in the NR system has increased by three to four times compared with LTE system, accounting for an increasing proportion of operators' overhead.

Therefore, it needs to further discuss and study how to reduce the power consumption of devices in the communication system.

In order to reduce power consumption of devices in the communication systems, a multiple-input multiple-output (MIMO) technology has received more and more attention and research. The MIMO technology is that multiple transmitting antennas are used at the transmitting side and multiple receiving antennas are used at the receiving side, so that communication signals may be transmitted through multiple antennas at the transmitting side and received through multiple antennas at the receiving side, thus improving communication quality. The MIMO technology enables to make full use of space resources, realize multiple transmission and reception through multiple antennas, so as to exponentially increase a system channel capacity without increasing spectrum resources and an antenna transmission power.

In an example, the network device configures a maximum number of MIMO layers (maxMIMO-Layers) for receiving a physical downlink shared channel (PDSCH) by the terminal device via Radio Resource Control (RRC) signaling. Alternatively, the maximum number of MIMO layers configured by the network device for the terminal device via RRC signaling is for indicating a maximum number of MIMO layers for receiving the PDSCH on all bandwidth parts (BWPs) of a serving cell, that is, the maximum number of MIMO layers configured by the network device for the terminal device via RRC signaling is common to all BWPs of one serving cell.

To further realize the energy saving of devices, optionally, the maximum number of MIMO layers configured by the network device for the terminal device via RRC signaling is for indicating the maximum number of MIMO layers for receiving PDSCH on a respective BWP, that is, the terminal device may use different maximum numbers of MIMO layers when receiving PDSCH on different BWPs, which is more conducive to the energy saving of the terminal device. For example, in the case of small business volume, the network device may switch the BWP of the terminal device to a BWP corresponding to a smaller maximum number of MIMO layers, so that the terminal device only needs to open a small number of radio-frequency (RF) channels for downlink data reception, thus realizing the energy saving of the terminal device. In the case of a large business volume, the network device may switch the BWP of the terminal device to a BWP corresponding to a larger maximum number of MIMO layers, thus realizing a rapid data transmission.

However, in the technical solution that a maximum number of MIMO layers is configured for the terminal device via RRC signaling has not fully considered the energy saving of the network device. For example, the network device may close some RF channels to realize energy saving when load of the network device is low. However, because the network device closes some RF channels, the number of ports for transmission is reduced, and then the corresponding number of MIMO layers that can be transmitted is also reduced. At this situation, the power consumption of the terminal device may be wasted if the terminal device still receives the PDSCH based on the maximum number of MIMO layers configured before the network device closes some RF channels.

On such basis, an embodiment of the disclosure provides a method for information transmission, which may be used for dynamically indicating the maximum number of MIMO layers to the terminal device by the network device. The technical solution of the disclosure will be described in combination with several embodiments below.

Figure 2:
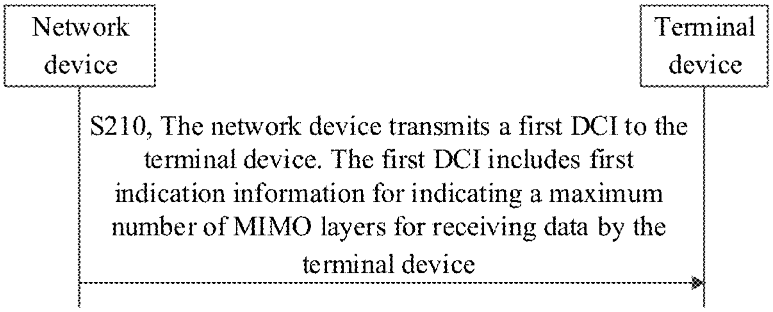
FIG. 2 is a flowchart of a method for information transmission provided in an embodiment of the disclosure.

Reference is made to FIG. 2, which illustrates a flowchart of a method for information transmission provided in an embodiment of the disclosure, the method is applicable to the system architecture shown in FIG. 1. The method may include at least part of operations in the following operations.

In operation S210, a network device transmits a first DCI to a terminal device. The first DCI includes first indication information for indicating a maximum number of MIMO layers for receiving data by the terminal device.

In an embodiment of the disclosure, a communication connection has been established between the network device and the terminal device based on the MIMO technology for transmission of signals. In order to dynamically indicate the maximum number of MIMO layers to the terminal device, the network device transmits a first DCI to the terminal device. The first DCI carries the first indication information for indicating the maximum number of MIMO layers for receiving data by the terminal device. In order to improve information transmission efficiency and avoid network devices notifying terminal devices one by one of the maximum number of MIMO layers, optionally, the first DCI is a DCI transmitted in a common search space, or the first DCI is a common DCI. The common search space includes a common physical downlink control channel (PDCCH) search space.

The embodiment of the disclosure does not limit the implementation of the first DCI. In an example, the first DCI is a defined DCI, in other words, the first DCI reuses a defined DCI; or, the first DCI is a newly defined DCI other than the defined DCI. Alternatively, the defined DCI includes DCI 2_0 (or called DCI of format 2_0) and DCI 2_6 (or called DCI of format 2_6). The defined DCI may also include DCI 2_1 (or called DCI of format 2_1), DCI 2_2 (or called DCI of format 2_2), DCI 2_3 (or called DCI of format 2_3), DCI 2_4 (or called DCI of format 2_4), DCI 2_5 (or called DCI of format 2_5), etc., which is not limited in the embodiment of the disclosure.

The first DCI includes the first indication information for indicating the maximum number of MIMO layers, and the number of bits occupied by the first indication information in the first DCI is not limited in the embodiment of the disclosure. In an example, the number of bits occupied by the first indication information in the first DCI is n, n is a positive integer. Alternatively, n is equal to 1; or n is equal to 2; or n is equal to 3; or n is equal to 4. In case that the first DCI is the defined DCI (the first DCI reuses the defined DCI), n bits may be added to the defined DCI to carry the first indication information, so that the defined DCI needs to add n bits on the basis of the original bit number. Alternatively, the reserved bits in the defined DCI may be used to carry the first indication information, that is, n bits are divided out of the reserved bits in the defined DCI to carry the first indication information, so that the number of bits occupied by the defined DCI may remain unchanged.

Since the first indication information is for indicating the maximum number of MIMO layers for receiving data by the terminal device, a correspondence between a value of the first indication information and the maximum number of MIMO layers may be set, so that the terminal device may determine the maximum number of MIMO layers based on the value of the first indication information after acquiring the first indication information. The correspondence between the value of the first indication information and the maximum number of MIMO layers may be predefined in the communication protocol or configured by the network device. In an example, there is a many-to-one relationship between the value of the first indication information and the maximum number of MIMO layers, that is, multiple values of the first indication information correspond to one possible maximum number of MIMO layers. In another example, there is a one-to-one relationship between the value of the first indication information and the maximum number of MIMO layers, that is, one value of the first indication information corresponds to one possible maximum number of MIMO layers, and each of different values of the first indication information correspond to a respective possible maximum numbers of MIMO layers.

Taking the one-to-one relationship between the value of the first indication information and the maximum number of MIMO layers as an example, optionally, when the value of the first indication information is m, the maximum number of MIMO layers indicated by the first indication information is m+1, m is a natural number. For example, when the value of the first indication information is 1, the maximum number of MIMO layers indicated by the first indication information is 2. When the value of the first indication information is 3, the maximum number of MIMO layers indicated by the first indication information is 4. Optionally, the corresponding relationship between the value of the first indication information and the maximum number of MIMO layers may also be set in an arbitrary way, which is not limited in the embodiment of the disclosure. For example, when the value of the first indication information is 1, the maximum number of MIMO layers indicated by the first indication information is 8. When the value of the first indication information is 3, the maximum number of MIMO layers indicated by the first indication information is 2.

In the following, a manner of indicating the maximum number of MIMO layers by the first indication information will be described with a specific example.

Illustratively, the number of bits occupied by the first indication information in the first DCI is 3, then there are eight possible values of the first indication information, so that the first indication information is able to indicate at most eight possible maximum numbers of MIMO layers. Alternatively, in case that the first indication information is "000", the value of the first indication information is 0, and the maximum number of MIMO layers indicated by the first indication information is 1; in case that the first indication information is "001", the value of the first indication information is 1, and the maximum number of MIMO layers indicated by the first indication information is 2; in case that the first indication information is "010", the value of the first indication information is 2, and the maximum number of MIMO layers indicated by the first indication information is 3; in case that the first indication information is "011", the value of the first indication information is 3, and the maximum number of MIMO layers indicated by the first indication information is 4; in case that the first indication information is "100", the value of the first indication information is 4, and the maximum number of MIMO layers indicated by the first indication information is 5; in case that the first indication information is "101", the value of the first indication information is 5, and the maximum number of MIMO layers indicated by the first indication information is 6; in case that the first indication information is "110", the value of the first indication information being 6, and the maximum number of MIMO layers indicated by the first indication information is 7; in case that the first indication information is "111", the value of the first indication information is 7, and the maximum number of MIMO layers indicated by the first indication information is 8.

The terminal device, after receiving the first indication information and acquiring the maximum number of MIMO layers indicated by the first indication information, may receive data based on the maximum number of MIMO layers indicated by the first indication information, or ignore the maximum number of MIMO layers indicated by the first indication information and receive data based on the original maximum number of MIMO layers, which is not limited in the embodiment of the disclosure. In case that the terminal device receives data based on the maximum number of MIMO layers indicated by the first indication information, the terminal device may receive the data based on the maximum number of MIMO layers indicated by the first indication information immediately, or received based on the maximum number of MIMO layers indicated by the first indication information after a time period, which is not limited in the embodiment of the disclosure. Further introductions on how the terminal device receives data may be referred to the following embodiments and will not be elaborated herein.

Accordingly, in the technical solutions provided by the embodiments of the disclosure, the maximum number of MIMO layers is indicated by the network device to the terminal device through DCI signaling, so that the maximum number of MIMO layers can be dynamically adjusted during the data transmission process. According to the technical solutions provided in embodiments of the disclosure, the network device transmits the DCI signaling to the terminal device to indicate the adjusted maximum number of MIMO layers in case that the network device has adjusted the number of RF channels based on a load condition and further adjusted the maximum number of MIMO layers. Therefore, the energy saving of the network device is more fully considered and the energy saving of the network device which is consistent with the energy saving of the terminal device can be achieved.

As described in the above embodiments, in case that the terminal device receives data based on the maximum number of MIMO layers indicated by the first indication information, the terminal device may receive the data based on the maximum number of MIMO layers indicated by the first indication information after a time period.

On such basis, in an example, after the operation S210 described above, the terminal device receives the data based on the maximum number of MIMO layers indicated by the first indication information after a first time period. That is to say, in the example, a condition precedent is set for using the maximum number of MIMO layers indicated by the first indication information, the condition precedent includes elapse of the first time period. The terminal device receives the data based on the maximum number of MIMO layers indicated by the first indication information when the condition precedent is met, such as after the first time period.

The embodiment of the disclosure does not limit a starting time of the first time period. Optionally, the starting time of the first time period includes one of: a starting time for receiving the first DCI, an ending time for receiving the first DCI, a starting time for receiving a last symbol occupied by a PDCCH carrying the first DCI, an ending time for receiving the last symbol occupied by the PDCCH carrying the first DCI, a starting time for receiving a first symbol occupied by the PDCCH carrying the first DCI, an ending time for receiving the first symbol occupied by the PDCCH carrying the first DCI, a starting time of a slot in which the first DCI is located, or an ending time of the slot in which the first DCI is located. Alternatively, the starting time of the first time period is predefined by a communication protocol, or the starting time of the first time period is configured by a network device.

The embodiment of the disclosure also does not limit a duration of the first time period. In an example, the duration of the first time period is predefined by a communication protocol; or the duration of the first time period is configured by a network device. In another example, the duration of the first time period is less than or equal to a first duration predefined by a communication protocol or configured by a network device. In other words, a maximum duration of the first time period is predefined by the communication protocol or configured by the network device, and the terminal device may flexibly enable the maximum number of MIMO layers indicated by the first indication information based on its own implementation.

According to the above embodiments, the terminal device may receive the data based on the maximum number of MIMO layers indicated by the first indication information after acquiring the maximum number of MIMO layers indicated by the first indication information. If the terminal device has acquired a corresponding maximum number of MIMO layers from RRC signaling previously, the terminal device may receive the data based on the maximum number of MIMO layers indicated by the first indication information, or ignore the maximum number of MIMO layers indicated by the first indication information and still receive the data based on the previous maximum number of MIMO layers.

On such basis, in an example, after operation S210 described above, the terminal device receives the data based on the maximum number of MIMO layers indicated by the first indication information when the maximum number of MIMO layers indicated by the first indication information is smaller than a maximum number of MIMO layers indicated by RRC signaling; and the terminal device receives the data based on the maximum number of MIMO layers indicated by the RRC signaling when the maximum number of MIMO layers indicated by the first indication information is greater than the maximum number of MIMO layers indicated by the RRC signaling.

In other words, in the example, if the maximum number of MIMO layers indicated by the first indication information is smaller than the maximum number of MIMO layers indicated by the RRC signaling, the terminal device receives the data based on the maximum number of MIMO layers indicated by the first indication information, and the maximum number of MIMO layers indicated by the RRC signaling is replaced with the maximum number of MIMO layers indicated by the first indication information. If the maximum number of MIMO layers indicated by the first indication information is larger than the maximum number of MIMO layers indicated by the RRC signaling, the terminal device still receives the data based on the maximum number of MIMO layers indicated by the RRC signaling, and the maximum number of MIMO layers indicated by the first indication information is ignored.

Alternatively, in case that the terminal device receives the data based on the maximum number of MIMO layers indicated by the first indication information, the terminal device receives the data based on the maximum number of MIMO layers indicated by the first indication information after a first time period. The introduction of the first time period may be referred to the above embodiments and will not be elaborated herein.

The operation performed by the terminal device when the maximum number of MIMO layers indicated by the first indication information is equal to the maximum number of MIMO layers indicated by the RRC signaling is not limited in the example. In an example, after the operation S210 described above, the method may further include the following operation. The terminal device receives the data based on the maximum number of MIMO layers indicated by the first indication information when the maximum number of MIMO layers indicated by the first indication information is equal to a maximum number of MIMO layers indicated by RRC signaling. In another example, the terminal device receives the data based on a maximum number of MIMO layers indicated by RRC signaling when the maximum number of MIMO layers indicated by the first indication information is equal to the maximum number of MIMO layers indicated by the RRC signaling.

Illustratively, the terminal device receives the data based on the maximum number of MIMO layers indicated by the first indication information when the maximum number of MIMO layers indicated by the first indication information is less than or equal to the maximum number of MIMO layers indicated by the RRC signaling; and the terminal device receives the data based on the maximum number of MIMO layers indicated by the RRC signaling when the maximum number of MIMO layers indicated by the first indication information is greater than the maximum number of MIMO layers indicated by the RRC signaling.

Illustratively, the terminal device receives the data based on the maximum number of MIMO layers indicated by the first indication information when the maximum number of MIMO layers indicated by the first indication information is less than the maximum number of MIMO layers indicated by the RRC signaling; and the terminal device receives the data based on the maximum number of MIMO layers indicated by the RRC signaling when the maximum number of MIMO layers indicated by the first indication information is greater than or equal to the maximum number of MIMO layers indicated by the RRC signaling.

Accordingly, in the technical solutions provided in the embodiment of the disclosure, a condition precedent, i.e., the first time period is set for enabling the maximum number of MIMO layers indicated by DCI signaling, such that the terminal device only receives the data based on the maximum number of MIMO layers indicated by the DCI signaling after the first time period, which reserves a buffer time for the terminal device to adjust the maximum number of MIMO layers. Moreover, the terminal device still receives the data based on the maximum number of MIMO layers indicated by the RRC signaling when the maximum number of MIMO layers indicated by DCI signaling is greater than the maximum number of MIMO layers indicated by the RRC signaling in the technical solutions provided by the embodiment of the disclosure, so that the energy saving of the terminal device can be ensured.

It should be noted that in the above method embodiments, the technical solutions of the disclosure are introduced from the perspective of interaction between the terminal device and the network device. The above-mentioned operations performed by the terminal device may be individually realized as a method for information transmission on the terminal device side; and the above-mentioned operations performed by the network device may be individually realized as a method for information transmission on the network device side.

The following describes embodiments of devices in the disclosure, the device may be configured to perform method embodiments of the disclosure. The details not disclosed in device embodiments of the disclosure may be referred to method embodiments of the disclosure.

Figure 3:
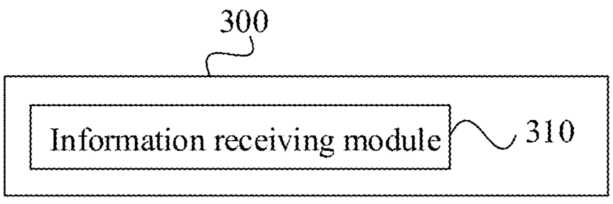
FIG. 3 is a block diagram of an apparatus for information transmission provided in an embodiment of the disclosure.

Reference is made to FIG. 3, which illustrates a block diagram of an apparatus for information transmission provided by an embodiment of the disclosure. The apparatus has functions of realizing the examples in the above method for information transmission, the functions may be realized by hardware or by executing corresponding software by hardware. The apparatus may be the terminal device described above or may be arranged in the terminal device. As shown in FIG. 3, the apparatus 300 may include an information receiving module 310.

The information receiving module 310 is configured to receive first DCI. The first DCI includes first indication information for indicating a maximum number of MIMO layers for receiving data by the terminal device.

In an example, the first DCI is a DCI transmitted in a common search space.

In an example, the first DCI is a defined DCI; or the first DCI is a newly defined DCI other than the defined DCI.

In an example, the defined DCI includes DCI 2_0 and DCI 2_6.

In an example, a number of bits occupied by the first indication information in the first DCI is n, n is a positive integer.

In an example, n is equal to 1; or n is equal to 2; or n is equal to 3.

In an example, when a value of the first indication information is m, the maximum number of MIMO layers indicated by the first indication information is m+1, m is a natural number.

Figure 4:
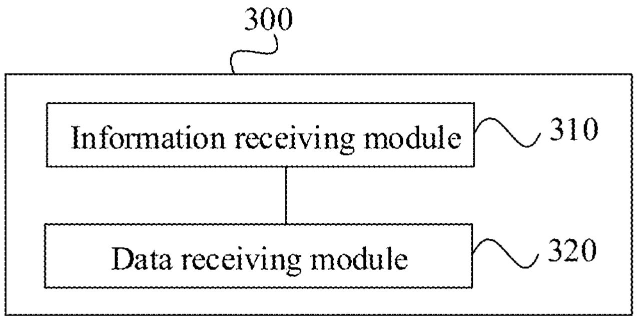
FIG. 4 is a block diagram of an apparatus for information transmission provided in another embodiment of the disclosure.

In an example, as shown in FIG. 4, the apparatus 300 further includes a data receiving module 320. The data receiving module 320 is configured to receive the data based on the maximum number of MIMO layers indicated by the first indication information after a first time period.

In an example, a starting time of the first time period includes one of: a starting time for receiving the first DCI, an ending time for receiving the first DCI, a starting time for receiving a last symbol occupied by a PDCCH carrying the first DCI, an ending time for receiving the last symbol occupied by the PDCCH carrying the first DCI, a starting time for receiving a first symbol occupied by the PDCCH carrying the first DCI, an ending time for receiving the first symbol occupied by the PDCCH carrying the first DCI, a starting time of a slot in which the first DCI is located, or an ending time of the slot in which the first DCI is located.

In an example, a duration of the first time period is predefined by a communication protocol; or a duration of the first time period is configured by a network device.

In an example, as shown in FIG. 4, the apparatus further includes a data receiving module 320. The data receiving module 320 is configured to receive the data based on the maximum number of MIMO layers indicated by the first indication information when the maximum number of MIMO layers indicated by the first indication information is smaller than a maximum number of MIMO layers indicated by RRC signaling.

In an example, as shown in FIG. 4, the apparatus further includes a data receiving module 320. The data receiving module 320 is configured to receive the data based on a maximum number of MIMO layers indicated by RRC signaling when the maximum number of MIMO layers indicated by the first indication information is greater than the maximum number of MIMO layers indicated by the RRC signaling.

In an example, as shown in FIG. 4, the apparatus further includes a data receiving module 320. The data receiving module 320 is configured to: receive the data based on the maximum number of MIMO layers indicated by the first indication information when the maximum number of MIMO layers indicated by the first indication information is equal to a maximum number of MIMO layers indicated by RRC signaling; or receive the data based on a maximum number of MIMO layers indicated by RRC signaling when the maximum number of MIMO layers indicated by the first indication information is equal to the maximum number of MIMO layers indicated by the RRC signaling.

Accordingly, in the technical solutions provided by the embodiment of the disclosure, the maximum number of MIMO layers is indicated by the network device to the terminal device through DCI signaling, so that the maximum number of MIMO layers can be dynamically adjusted during the data transmission process. According to the technical solutions provided in embodiments of the disclosure, the network device transmits the DCI signaling to the terminal device to indicate the adjusted maximum number of MIMO layers in case that the network device has adjusted the number of RF channels based on a load condition and further adjusted the maximum number of MIMO layers. Therefore, the energy saving of the network device is more fully considered and the energy saving of the network device which is consistent with the energy saving of the terminal device can be achieved.

Figure 5:
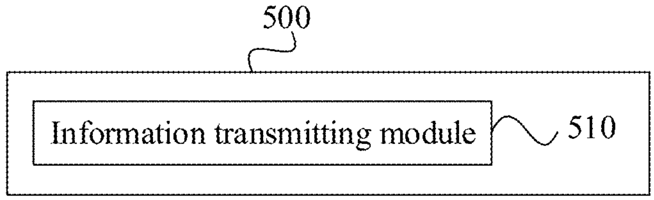
FIG. 5 is a block diagram of an apparatus for information transmission provided in yet another embodiment of the disclosure.

Reference is made to FIG. 5, which illustrates a block diagram of an apparatus for information transmission provided by an embodiment of the disclosure. The apparatus has functions of realizing the examples in THE above method for information transmission, the functions may be realized by hardware or by executing corresponding software by hardware. The apparatus may be the network device described above or may be arranged in the network device. As shown in FIG. 5, the apparatus 500 may include an information transmitting module 510.

The information transmitting module 510 is configured to transmit first DCI. The first DCI includes first indication information for indicating a maximum number of MIMO layers for receiving data by a terminal device.

In an example, the first DCI is a DCI transmitted in a common search space.

In an example, the first DCI is a defined DCI; or the first DCI is a newly defined DCI other than the defined DCI.

In an example, the defined DCI includes DCI 2_0 and DCI 2_6.

In an example, a number of bits occupied by the first indication information in the first DCI is n, n is a positive integer.

In an example, n is equal to 1; or n is equal to 2; or n is equal to 3.

In an example, when a value of the first indication information is m, the maximum number of MIMO layers indicated by the first indication information is m+1, m is a natural number.

Accordingly, in the technical solutions provided by the embodiment of the disclosure, the maximum number of MIMO layers is indicated by the network device to the terminal device through DCI signaling, so that the maximum number of MIMO layers can be dynamically adjusted during the data transmission process. According to the technical solutions provided in embodiments of the disclosure, the network device transmits the DCI signaling to the terminal device to indicate the adjusted maximum number of MIMO layers in case that the network device has adjusted the number of RF channels based on a load condition and further adjusted the maximum number of MIMO layers. Therefore, the energy saving of the network device is more fully considered and the energy saving of the network device which is consistent with the energy saving of the terminal device can be achieved.

It should be noted that when the apparatus provided in the above embodiments realizes its functions, the division of various functional modules is only used as an example. In practical application, the functions described above may be assigned to different functional modules as needed, that is, the content structure of the apparatus may be divided into different functional modules to achieve all or part of the functions described above.

With regard to the apparatus in the above embodiments, the specific manners in which the respective modules perform operations have been described in detail in the embodiments related to the method and will not be explained in detail herein.

Figure 6:
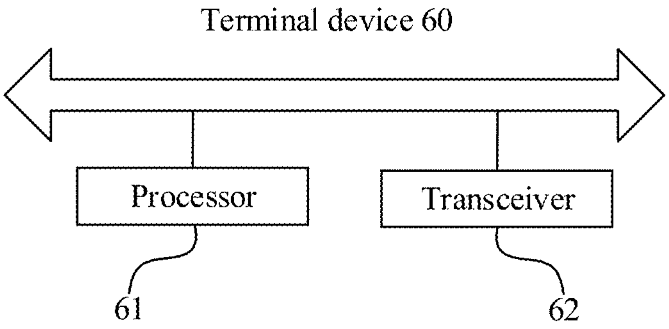
FIG. 6 is a schematic structural diagram of a terminal device provided in an embodiment of the disclosure.

Reference is made to FIG. 6, which illustrates a schematic structural diagram of a terminal device 60 provided in an embodiment of the disclosure. For example, the terminal device may be configured to perform the above-mentioned method for information transmission on the terminal device side. Specifically, the terminal device 60 may include a processor 61 and a transceiver 62 connected to the processor 61.

The processor 61 includes one or more processing cores and executes various functional applications and information processing by running software programs and modules.

The transceiver 62 includes a receiver and a transmitter. Optionally, the transceiver 62 is a communication chip.

In an example, the terminal device 60 also includes a memory and a bus. The memory is connected to the processor via the bus. The memory is configured to store a computer program, and the processor is configured to execute the computer program to implement operations performed by the terminal device in the above method embodiments.

In addition, the memory may be implemented by any type of volatile or non-volatile storage or a combination thereof. The volatile or non-volatile storage includes but not limited to: a random access memory (RAM) and a read-only memory (ROM), an erasable programmable ROM (EPROM), an electrically erasable programmable ROM (EEPROM), a flash memory or other solid-state memory technologies, a compact disc ROM (CD-ROM), a digital video disc (DVD) or other optical storages, cassettes, magnetic tapes, magnetic disk storages or other magnetic storages.

The transceiver is configured to receive a first DCI. The first DCI includes first indication information for indicating a maximum number of MIMO layers for receiving data by the terminal device.

In an example, the first DCI is a DCI transmitted in a common search space.

In an example, the first DCI is a defined DCI; or the first DCI is a newly defined DCI other than the defined DCI.

In an example, the defined DCI includes DCI 2_0 and DCI 2_6.

In an example, a number of bits occupied by the first indication information in the first DCI is n, n is a positive integer.

In an example, n is equal to 1; or n is equal to 2; or n is equal to 3.

In an example, when a value of the first indication information is m, the maximum number of MIMO layers indicated by the first indication information is m+1, m is a natural number.

In an example, the transceiver is further configured to receive the data based on the maximum number of MIMO layers indicated by the first indication information after a first time period.

In an example, a starting time of the first time period includes one of: a starting time for receiving the first DCI, an ending time for receiving the first DCI, a starting time for receiving a last symbol occupied by a PDCCH carrying the first DCI, an ending time for receiving the last symbol occupied by the PDCCH carrying the first DCI, a starting time for receiving a first symbol occupied by the PDCCH carrying the first DCI, an ending time for receiving the first symbol occupied by the PDCCH carrying the first DCI, a starting time of a slot in which the first DCI is located, or an ending time of the slot in which the first DCI is located.

In an example, a duration of the first time period is predefined by a communication protocol; or a duration of the first time period is configured by a network device.

In an example, the transceiver is further configured to receive the data based on the maximum number of MIMO layers indicated by the first indication information when the maximum number of MIMO layers indicated by the first indication information is smaller than a maximum number of MIMO layers indicated by RRC signaling.

In an example, the transceiver is further configured to receive the data based on a maximum number of MIMO layers indicated by RRC signaling when the maximum number of MIMO layers indicated by the first indication information is greater than the maximum number of MIMO layers indicated by the RRC signaling.

In an example, the transceiver is further configured to: receive the data based on the maximum number of MIMO layers indicated by the first indication information when the maximum number of MIMO layers indicated by the first indication information is equal to a maximum number of MIMO layers indicated by RRC signaling; or receive the data based on a maximum number of MIMO layers indicated by RRC signaling when the maximum number of MIMO layers indicated by the first indication information is equal to the maximum number of MIMO layers indicated by the RRC signaling.

Figure 7:
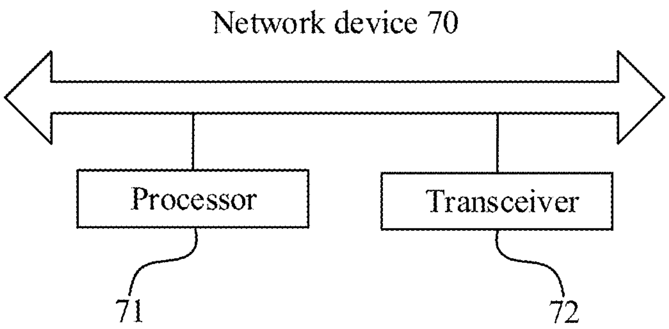
FIG. 7 is a schematic structural diagram of a network device provided in an embodiment of the disclosure.

Reference is made to FIG. 7, which shows a schematic structural diagram of a network device 70 provided by an embodiment of the disclosure. For example, the network device may be configured to perform the above-mentioned method for information transmission on the network device side. Specifically, the network device 70 may include a processor 71 and a transceiver 72 connected to the processor 71.

The processor 71 includes one or more processing cores and executes various functional disclosures and information processing by running software programs and modules.

The transceiver 72 includes a receiver and a transmitter. Optionally, the transceiver 72 is a communication chip.

In an example, the network device 70 further includes a memory and a bus. The memory is connected to the processor via the bus. The memory is configured to store a computer program, and the processor is configured to execute the computer program to implement operations performed by the network device in the above method embodiments.

In addition, the memory may be implemented by any type of volatile or non-volatile storage or a combination thereof. The volatile or non-volatile storage includes but not limited to: an RAM and an ROM, an EPROM, an EEPROM, a flash memory or other solid-state memory technologies, a CD-ROM, a DVD or other optical storages, cassettes, magnetic tapes, magnetic disk storages or other magnetic storages.

The transceiver is configured to transmit a first DCI. The first DCI includes first indication information for indicating a maximum number of MIMO layers for receiving data by a terminal device.

In an example, the first DCI is a DCI transmitted in a common search space.

In an example, the first DCI is a defined DCI; or the first DCI is a newly defined DCI other than the defined DCI.

In an example, the defined DCI includes DCI 2_0 and DCI 2_6.

In an example, a number of bits occupied by the first indication information in the first DCI is n, n is a positive integer.

In an example, n is equal to 1; or n is equal to 2; or n is equal to 3.

In an example, when a value of the first indication information is m, the maximum number of MIMO layers indicated by the first indication information is m+1, m is a natural number.

An embodiment of the disclosure also provides a computer-readable storage medium, having stored thereon a computer program which, when being executed by a processor of a terminal device, causes the processor to perform the method for information transmission on the terminal device side as described above.

An embodiment of the disclosure also provides a computer-readable storage medium having stored thereon a computer program which, when being executed by a processor of a terminal device, causes the processor to perform the method for information transmission on the network device side as described above.

An embodiment of the disclosure also provides a chip including a programmable logic circuitry and/or program instructions, when the chip is run on a terminal device, the chip is used causes the terminal device to perform the method for information transmission on the terminal device side as described above.

An embodiment of the disclosure also provides a chip including programmable logic circuitry and/or program instructions, when the chip is run on a network device, the chip is used causes the network device to perform the method for information transmission on the network device side as described above.

An embodiment of the disclosure also provides a computer program product, when being run on a terminal device, causes the terminal device to perform the method for information transmission on the terminal device side as described above.

An embodiment of the disclosure also provides a computer program product, when running on a network device, causes the network device to perform the method for information transmission on the network device side as described above.

Those skilled in the art will understand that in one or more of the above examples, the functions described by embodiments of the disclosure may be implemented in hardware, software, firmware, or any combination thereof. When the functions are implemented in software, these functions may be stored in a computer-readable medium or may be transmitted as one or more instructions or codes on the computer-readable medium. The computer-readable medium includes a computer storage medium and a communication medium, the communication medium includes a medium that facilitates transmission of a computer program from one place to another. The storage medium may be any available medium accessible to a general-purpose computer or a special-purpose computer.

The technical solutions provided by the embodiments of the disclosure may include the following beneficial effects.

The network device indicates the maximum number of MIMO layers to the terminal device by using the DCI signaling, thus the maximum number of MIMO layers is dynamically adjusted during a process of data transmission. According to the technical solutions provided by the embodiments of the disclosure, the network device transmits the DCI signaling to the terminal device to indicate the adjusted maximum number of MIMO layers in case that the network device has adjusted the number of radio frequency channels based on a load condition and further adjusted the maximum number of MIMO layers. Therefore, energy saving of the network device is more fully considered and the energy saving of the network device which is consistent with the energy saving of the terminal device can be achieved.

The above specification describes only exemplary embodiments of the disclosure and is not intended to limit the disclosure. Any modification, equivalent replacement, improvement, and the like made within the spirits and principles of the disclosure shall be included in the scope of protection of the disclosure.

The invention claimed is:

1. A method for information transmission, applied to a terminal device, the method comprising:
 receiving first downlink control information (DCI), wherein the first DCI comprises first indication information for indicating a first maximum number of multiple-input multiple-output (MIMO) layers for receiving data by the terminal device,
 wherein the method further comprises:
 receiving radio resource control (RRC) signaling indicating a second maximum number of MIMO layers; and
 receiving the data based on the first maximum number of MIMO layers indicated by the first indication information when the first maximum number of MIMO layers indicated by the first indication information is smaller than the second maximum number of MIMO layers indicated by the RRC signaling.

2. The method of claim 1, wherein the first DCI is a DCI transmitted in a common search space.

3. The method of claim 1, wherein the first DCI is a defined DCI, and wherein the defined DCI comprises DCI 2_0 and DCI 2_6.

4. The method of claim 1, wherein a number of bits occupied by the first indication information in the first DCI is n, n being a positive integer, and wherein n is equal to 1; or n is equal to 2; or n is equal to 3.

5. The method of claim 1, wherein when a value of the first indication information is m, the first maximum number of MIMO layers indicated by the first indication information is m+1, m being a natural number.

6. A method for information transmission, applied to a network device, the method comprising:
 transmitting first downlink control information (DCI), wherein the first DCI comprises first indication information for indicating a first maximum number of multiple-input multiple-output (MIMO) layers for receiving data by a terminal device,
 wherein the method further comprises:
 transmitting radio resource control (RRC) signaling indicating a second maximum number of MIMO layers, wherein the first maximum number of MIMO layer and the second maximum number of MIMO layers are used for the terminal device to receive the data based on the first maximum number of MIMO layers indicated by the first indication information when the first maximum number of MIMO layers indicated by the first indication information is smaller than the second maximum number of MIMO layers indicated by the RRC signaling.

7. The method of claim 6, wherein the first DCI is a DCI transmitted in a common search space.

8. The method of claim 6, wherein the first DCI is a defined DCI, and wherein the defined DCI comprises DCI 2_0 and DCI 2_6.

9. The method of claim 6, wherein a number of bits occupied by the first indication information in the first DCI is n, n being a positive integer, and wherein n is equal to 1; or n is equal to 2; or n is equal to 3.

10. The method of claim 6, wherein when a value of the first indication information is m, the first maximum number of MIMO layers indicated by the first indication information is m+1, m being a natural number.

11. An apparatus comprising a processor and a transceiver connected to the processor, wherein the processor is configured to control the transceiver to perform the operations of method of claim 6.

12. An apparatus for information transmission, provided in a terminal device, the apparatus comprising a processor and a transceiver connected to the processor, wherein:
 the processor is configured to control the transceiver to receive first downlink control information (DCI), wherein the first DCI comprises first indication information for indicating a first maximum number of multiple-input multiple-output (MIMO) layers for receiving data by the terminal device, and the processor is further configured to control the transceiver to:
 receive radio resource control (RRC) signaling indicating a second maximum number of MIMO layers; and
 receive the data based on the first maximum number of MIMO layers indicated by the first indication information when the first maximum number of MIMO layers indicated by the first indication information is smaller than the second maximum number of MIMO layers indicated by the RRC signaling.

13. The apparatus of claim 12, wherein the first DCI is a DCI transmitted in a common search space.

14. The apparatus of claim 12, wherein the first DCI is a defined DCI.

15. The apparatus of claim 12, wherein the processor is further configured to control the transceiver to:
 receive the data based on the first maximum number of MIMO layers indicated by the first indication information after a first time period.

16. The apparatus of claim 15, wherein a starting time of the first time period comprises one of: a starting time for receiving the first DCI, an ending time for receiving the first DCI, a starting time for receiving a last symbol occupied by a physical downlink control channel (PDCCH) carrying the first DCI, an ending time for receiving the last symbol occupied by the PDCCH carrying the first DCI, a starting time for receiving a first symbol occupied by the PDCCH carrying the first DCI, an ending time for receiving the first symbol occupied by the PDCCH carrying the first DCI, a starting time of a slot in which the first DCI is located, or an ending time of the slot in which the first DCI is located.

17. The apparatus of claim 15, wherein a duration of the first time period is predefined by a communication protocol; or a duration of the first time period is configured by a network device.

18. The apparatus of claim 12, wherein the processor is further configured to control the transceiver to:
 receive the data based on the second maximum number of MIMO layers indicated by the RRC signaling when the first maximum number of MIMO layers indicated by the first indication information is greater than the second maximum number of MIMO layers indicated by the RRC signaling.

19. The apparatus of claim 12, wherein the processor is further configured to control the transceiver to:
 receive the data based on the first maximum number of MIMO layers indicated by the first indication information when the first maximum number of MIMO layers indicated by the first indication information is equal to the second maximum number of MIMO layers indicated by the RRC signaling;
 or,
 receive the data based on the second maximum number of MIMO layers indicated by the RRC signaling when the first maximum number of MIMO layers indicated by the first indication information is equal to the second maximum number of MIMO layers indicated by the RRC signaling.

* * * * *